United States Patent
Chang

(10) Patent No.: US 9,060,348 B2
(45) Date of Patent: Jun. 16, 2015

(54) SYSTEM AND METHOD FOR PROVIDING A PUSH TO TALK OVER CELLULAR SERVICE

(71) Applicant: Samsung Electronics Co., Ltd., Gyeonggi-do (KR)

(72) Inventor: Deugku Chang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 292 days.

(21) Appl. No.: 13/645,029

(22) Filed: Oct. 4, 2012

(65) Prior Publication Data

US 2013/0084911 A1 Apr. 4, 2013

(30) Foreign Application Priority Data

Oct. 4, 2011 (KR) .......................... 10-2011-0100577

(51) Int. Cl.
*H04W 4/10* (2009.01)
*H04W 76/00* (2009.01)

(52) U.S. Cl.
CPC .............. *H04W 76/005* (2013.01); *H04W 4/10* (2013.01)

(58) Field of Classification Search
CPC ..... H04W 4/10; H04W 76/005; H04W 76/05; H04W 76/02; H04W 76/002; H04W 76/023
USPC ............ 455/518, 519, 517, 41.2, 422.1, 90.2; 370/518, 338, 360, 328, 401, 437, 310
See application file for complete search history.

(56) References Cited

U.S. PATENT DOCUMENTS

| | | | |
|---|---|---|---|
| 7,394,798 B2 * | 7/2008 | Naghian | 370/338 |
| 2005/0141541 A1 * | 6/2005 | Cuny et al. | 370/437 |
| 2006/0183491 A1 * | 8/2006 | Gundu et al. | 455/518 |
| 2006/0223563 A1 * | 10/2006 | Sung et al. | 455/518 |
| 2006/0234744 A1 * | 10/2006 | Sung et al. | 455/518 |
| 2006/0235981 A1 * | 10/2006 | Westman et al. | 709/227 |
| 2006/0294243 A1 * | 12/2006 | Kuure et al. | 709/227 |
| 2007/0021136 A1 * | 1/2007 | Allen | 455/518 |
| 2007/0082690 A1 * | 4/2007 | Fabien et al. | 455/518 |
| 2008/0153432 A1 | 6/2008 | Zhu et al. | |
| 2008/0273487 A1 * | 11/2008 | Naghian | 370/328 |
| 2009/0131092 A1 * | 5/2009 | Kaida | 455/518 |
| 2009/0257378 A1 * | 10/2009 | Cuny et al. | 370/328 |
| 2013/0029714 A1 * | 1/2013 | Koren et al. | 455/518 |

FOREIGN PATENT DOCUMENTS

| | | | |
|---|---|---|---|
| EP | 1 868 341 | 12/2007 | |
| EP | 1868341 A1 * | 12/2007 | .............. H04L 29/02 |
| WO | WO 96/00482 | 1/1996 | |
| WO | WO 2009/126072 | 10/2009 | |

* cited by examiner

*Primary Examiner* — Tan Trinh
(74) *Attorney, Agent, or Firm* — The Farrell Law Firm, P.C.

(57) ABSTRACT

A system and method are provided that provide Push to talk over Cellular (PoC) service via a PoC server. The method includes receiving, by the PoC server, a PoC group call request for requesting a PoC connection for a PoC group from a first User Equipment (UE); extracting information regarding a cell where a second UE that belonged to the PoC group is located, according to the received PoC group call request; comparing a number of current PoC connections corresponding to a cell with a maximum number of PoC connections to the cell; and establishing a PoC connection with the second UE, if the number of current PoC connections is less than the maximum number of PoC connections.

12 Claims, 11 Drawing Sheets

SYSTEM AND METHOD FOR PROVIDING A PUSH TO TALK OVER CELLULAR SERVICE

PRIORITY

This application claims priority under 35 U.S.C. §119(a) to a Korean Patent Application No. 10-2011-0100577, which was filed in the Korean Intellectual Property Office on Oct. 4, 2011, the entire disclosure of which is incorporated herein by reference.

BACKGROUND OF THE INVENTION

1. Field of the Invention

This invention relates generally to a Push to talk over Cellular (PoC) service, and more particularly, to a system and method that efficiently manages a connection while providing the PoC service.

2. Description of the Related Art

The 3$^{rd}$ Generation Partnership Project Internet Protocol (IP) Multimedia Subsystem (3GPP IMS) standard includes a standard regarding a PoC service and a Push-To-Talk (PTT) specification. The PTT, which is also known as Press-To-Transmit, is a method of conversing on half-duplex communication lines, where users set a transmission mode or a reception mode by operating a switch.

For example, users set a PTT device to a transmission mode by pressing the mode switch and revert to reception mode by releasing the mode switch. That is, a PTT device user A talks into a microphone while pressing the mode switch of the user A's PTT device, and another user B, who has subscribed to the same PTT group as user A, stands by, without pressing a mode switch of user B's PTT device. Accordingly, user B can hear what user A is saying via user B's PTT device. A typical example of a device using PTT is a handheld transceiver or a walkie-talkie.

PoC services refer to PTT services that are provided via a cellular communication network. Cellular communication networks support full-duplex via Frequency Division Multiplexing (FDM), Time Division Multiplexing (TDM), etc. If the networks use PoC services, they can transmit messages to a User Equipment (UE) that is not currently connected thereto, instead of half-duplex communication, because cellular mobile phones and cellular communication networks employ PoC services.

PoC services are provided based on PoC groups. For example, if a PoC group, G1, includes PoC devices, A, B, and C, data that device A transmits to group G1 in a transmission mode can be shared by devices B and C.

Further, one PoC device may be subscribed to a number of PoC groups. In that case, the PoC device selects which of the PoC groups it wants to transmit a corresponding message to or receive a corresponding message from.

A PoC application server identifies a PoC group session or the number of connections, executed according to the request of user equipment, in an environment where services are provided, according to a conventional IMS standard, via a mobile communication network. However, if communication congestion occurs in a PoC group in a cell, the PoC application server detects the congestion and controls the group calls.

SUMMARY OF THE INVENTION

The present invention has been made in view of the above-described problems, and provides at least the advantages described below.

An aspect of the present invention is to provide a system and method for controlling communication congestion in a PoC group based on cells and providing a PoC service.

In accordance with an aspect of the present invention, a method for providing a PoC service via a PoC server is provided. The method includes receiving, by the PoC server, a PoC group call request for requesting a PoC connection for a PoC group from a first User Equipment (UE); extracting information regarding a cell where a second UE that belonged to the PoC group is located, according to the received PoC group call request; comparing a number of current PoC connections corresponding to a cell with a maximum number of PoC connections to the cell; and establishing a PoC connection with the second UE, if the number of current PoC connections is less than the maximum number of PoC connections.

In accordance with another aspect of the present invention, a PoC application server for providing a PoC service is provided. The PoC application server includes a communication unit for receiving a PoC group call request for requesting a PoC connection for a PoC group from a first User Equipment (UE); a controller for extracting information regarding a cell where a second UE that belonged to the PoC group is located, according to the received PoC group call request, and comparing a number of current PoC connections corresponding to a cell with a maximum number of PoC connections to the cell. The communication unit establishes a PoC connection with the second UE, if the number of current PoC connections is less than the maximum number of PoC connections.

BRIEF DESCRIPTION OF THE DRAWINGS

The above and other aspects, features, and advantages of certain embodiments of the present invention will become more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
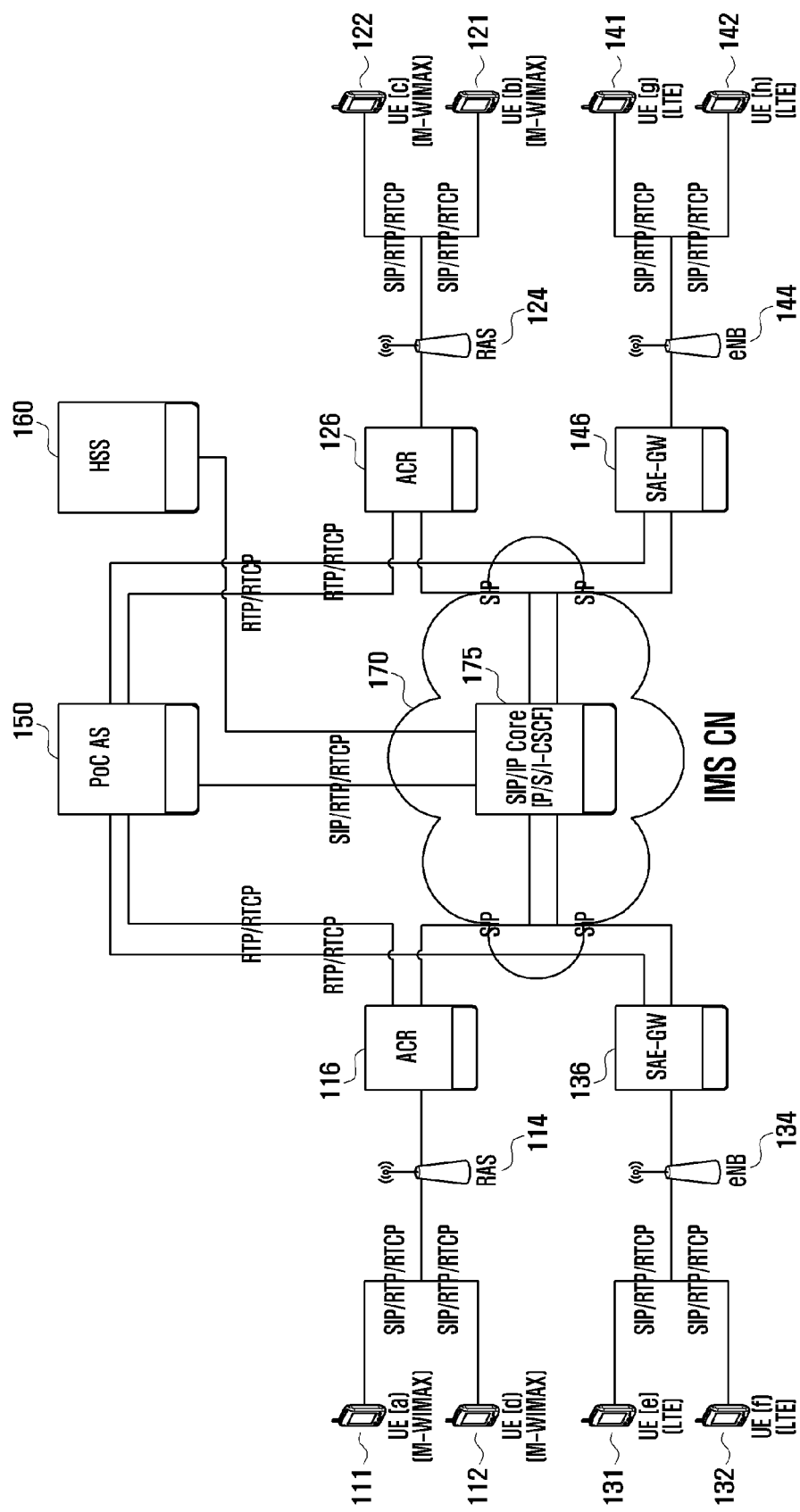
FIG. 1 illustrates a network that provides PoC services according to an embodiment of the invention.

FIG. 1 illustrates a network that provides PoC services according to an embodiment of the invention.

Referring to FIG. 1, the PoC service network includes a PoC application server (hereinafter referred to as a PoC server) 150, an IP Multimedia Subsystem Core Network (IMS CN) 170, and a Home Subscriber Server (HSS) 160. The IMS CN 170 includes a Session Initiation Protocol/Internet Protocol Core (SIP/IP) 175 for controlling calls and sessions. For example, the PoC serving network may support communication according to Mobile-Wimax (M-Wimax) and/or Long Term Evolution (LTE).

As illustrated in FIG. 1, the PoC service network includes UE 111, UE 112, a first Radio Access Station (RAS) 114, a first Access Control Router (ACR) 116, UE 121, UE 122, a second Radio Access Station (RAS) 124, and a second Access Control Router (ACR) 126, which communicate with each other according to M-Wimax.

In addition, the PoC service network includes UE 131, UE 132, a first eNode B (eNB) 134, a first System Architecture Evolution Gateway (SAE-GW) 136, UE 141, UE 142, a second eNB 144, and a second SAE-GW 146, which communicate with each other according to LTE.

Although the communication standard of UEs 111, 112, 121, and 122 differs from that of UEs 131, 132, 141, and 142, they all serve as UEs for cellular communication. Likewise, although the communication standard of RASs 114 and 124 differs from that of eNBs 134 and 144, they all serve as base stations. Therefore, RASs 114 and 124 and eNBs 134 and 144 are commonly referred to herein as base stations.

In addition, although the communication standard of ACRs 116 and 126 differs from that of SAE-GWs 136 and 146, they all serve as routers. Therefore, ACRs 116 and 126 and SAE-GWs 136 and 146 are commonly referred to herein as routers.

UEs 111, 112, 121, 122, 131, 132, 141, and 142 provide standard client functions proposed in the IMS standard, e.g., a Voice over Internet Protocol (VoIP) service request, a PoC group selection, and a PoC group call request, a function for controlling a right to talk, a function for providing location information when a service is requested, a function for providing information regarding an altered location, etc.

The base stations 114, 124, 134, and 144 and the routers 116, 126, 136, and 146 serve as agents that provide cellular services to the UEs 111, 112, 121, 122, 131, 132, 141, and 142.

The IMS CN 170 establishes a connection or disconnects according to the request of a VoIP service or the request of PoC group communication. Specifically, the IMS CN 170 receives an SIP signaling message from UE, parses the SIP signaling message, and processes the received SIP signaling message according to its service profile information or initial Filter Criteria (iFC). The IMS CN 170 transmits the received SIP message to a corresponding application server or a called service subscriber.

The PoC server 150 registers a PoC group according to a user or administrator request. The PoC server 150 receives a PoC group call request from a UE and establishes or controls the session/connection of the PoC group according to the request. The PoC server 150 controls call congestion, registers location information regarding base stations, and sets the number of limited connections by base stations. The PoC server 150 manages location information regarding the UE in real time.

The HSS 160 authenticates subscribers in IMS networks, and manages service profiles. The HSS 160 authenticates subscribers, cooperating with the IMS CN 170, and transfers profile information regarding permitted subscribers to the IMS CN 170. If a subscriber requests a service, the IMS CN 170 provides the subscriber with the service using profile information regarding the service previously provided.

Figure 2:
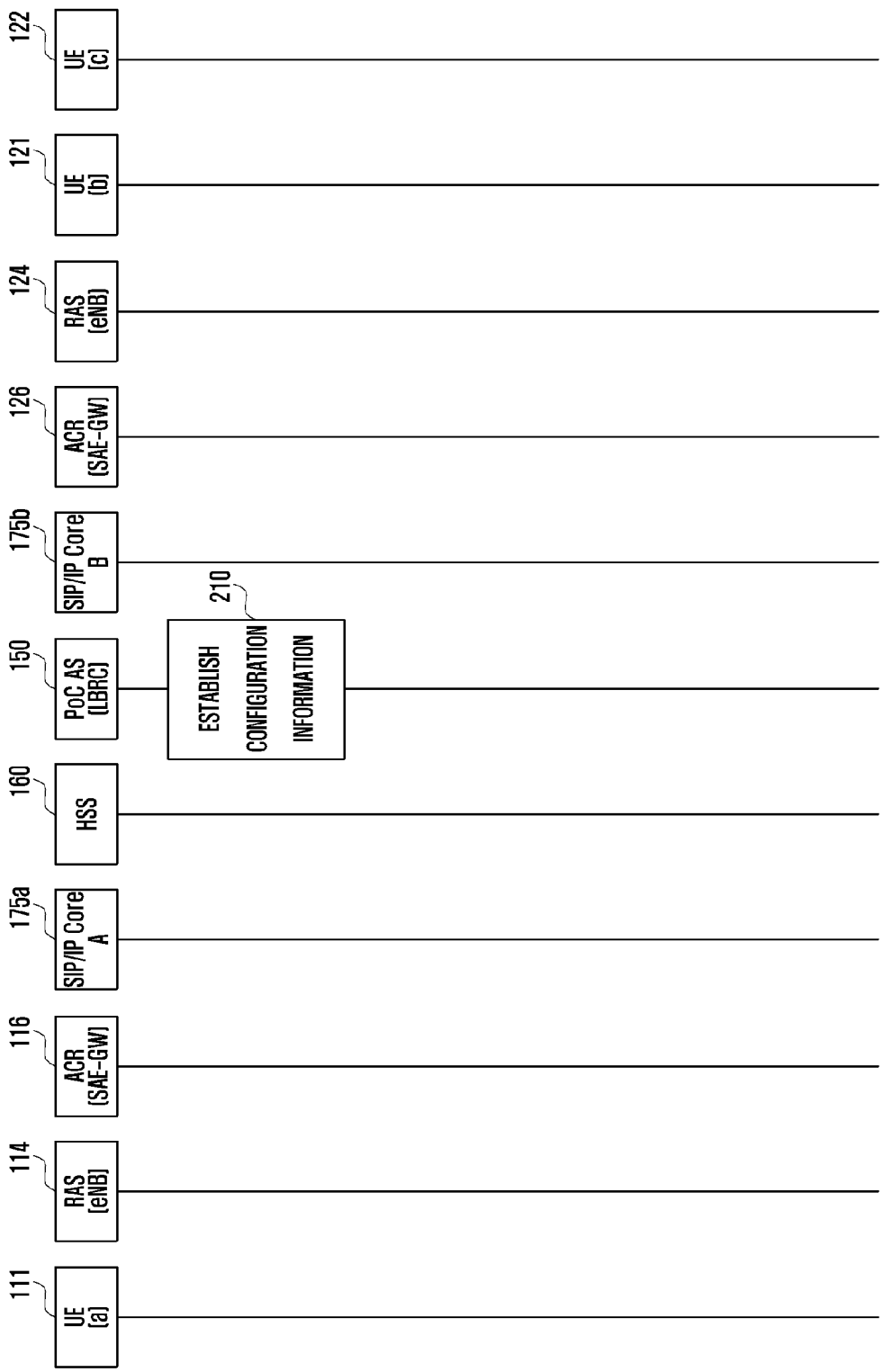
FIG. 2 is a signal flow diagram illustrating a method for establishing configuration information regarding a PoC application server, according to an embodiment of the invention.

FIG. 2 is a signal flow diagram illustrating a method for establishing configuration information regarding a PoC server, according to an embodiment of the invention.

Referring to FIG. 2, the PoC server 150 may include Location Base Resource Control (LBRC) as a location information control module. An administrator or operator may access PoC server 150, via open interface (e.g., Web, Graphic User Interface (GUI), etc.), for example, and set the configuration information in step 210. The administrator or operator may also set PoC group information and/or cell-based management information, for example. For example, the PoC group information and cell-based management information are configured as follows.

1) PoC Group Information

PoC group information refers to information regarding PoC groups managed by a PoC server. PoC group information regarding one PoC group includes at least four fields, e.g., an IDentifier (ID), a Name, Members, and a Priority.

ID: Identifier of the PoC group.

Name: Name of the PoC group.

Members: Identifiers of members subscribed to the PoC group.

Priority: Priority of the PoC group (e.g., 0-9, Variable).

It should be understood that the field names described above are exemplary and may be altered.

For example, the field, Name, is not an essential element, and the field, Priority, may be omitted from the PoC group information if priority is not taken into consideration.

2) Cell-Based Management Information

Total_Assigned_CellIds: Total number of cells that are allocated.

Total_Configured_Cellids: Total number of cells that are configured.

Total_Attached_UEs: Total number of UEs that are registered.

Total_Attached_UEs_Per_[ ]Cellid: Number of UEs registered in respective cells.

Total_GroupCall_Sessions: Total number of PoC connections that are being executed.

Total_GroupCall_Sessions_Per_[ ]Cellid: Number of PoC connections that are being executed in respective cells.

Total_VoipCall_Sessions: Total number of VoIP sessions that are being executed.

Total_VoipCall_Sessions_Per_[ ]Cellid: Number of VoIP sessions that are being executed in respective cells.

Threshold Values: Values when call congestions reach a critical state (number of limited connections). The number of limited connections may be set differently according to respective cells. It includes Max_GroupCall_Sessions_Per_[ ]Cellid and Max_VoipCall_Sessions_Per_[ ]Cellid.

Max_GroupCall_Sessions_Per_[ ]Cellid: Number of PoC group connections that can be simultaneously processed in respective cells.

Max_VoipCall_Sessions_Per_[ ]Cellid: Number of VoIP secessions that can be simultaneously processed in respective cells.

It should be understood that the names of data described above are exemplary and may be altered.

Further, the data, Total_VoipCall_Sessions, Total_VoipCall_Sessions_Per_[ ]Cellid, and Max_VoipCall_Sessions_Per_[ ]Cellid, may be omitted if the PoC server does not manage the number of VoIP connections.

The data, Total_Attached_UEs_Per_[ ]Cellid, Total_GroupCall_Sessions_Per_[ ]Cellid, Total_VoipCall_Sessions_Per_[ ]Cellid, Max_GroupCall_Sessions_Per_[ ]Cellid, and Max_VoipCall_Sessions_Per_[ ]Cellid, which hereinafter are collectively referred to as "cell data," may be set in respective cells with different values. That is, if the numbers of UEs registered in cells A and B are 1023 and 259, respectively, the cell data of cell A and cell B are set with 1023 and 259 for the respective locations. Cell data is stored in the array form. Cell-based management data other than cell data is set with a single value for the entire system.

Figure 3:
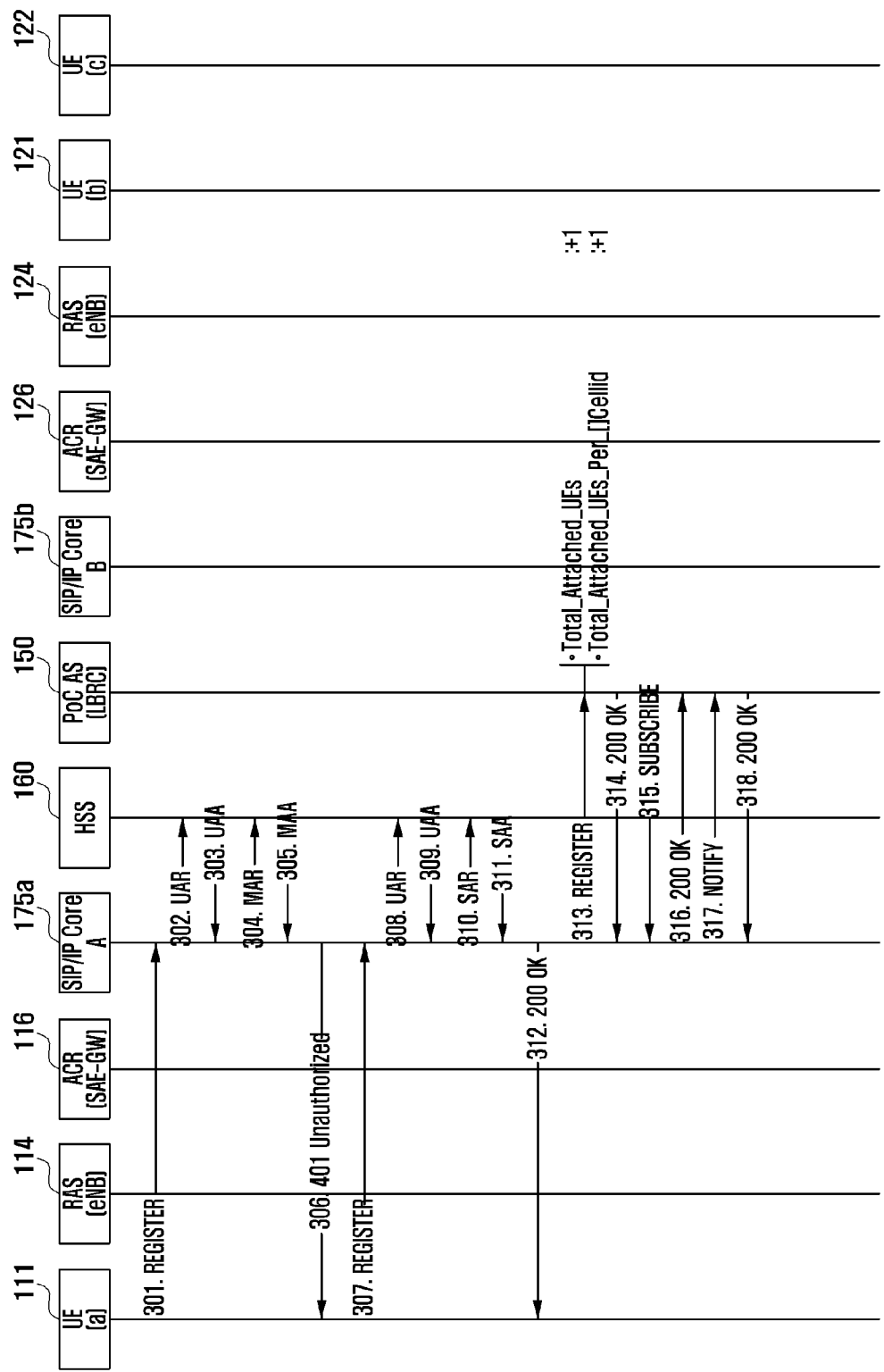
FIG. 3 is a signal flow diagram illustrating a method for registering a PoC service for a UE, according to an embodiment of the invention.

FIG. 3 is a signal flow diagram illustrating a method for registering a PoC service for a UE, according to an embodiment of the invention.

When the UE is turned on, it may automatically execute a service registration procedure. Alternatively, the service registration procedure may be executed when the service subscriber operates the UE.

Referring to FIG. 3, UE 111 transmits a registration message, REGISTER, to an SIP/IP Core A 175a, in step 301. In step 302, the SIP/IP Core A 175a transmits a command, User-Authorization-Request (UAR), to the HSS 160. In step 303, the HSS 160 transmits a command, User-Authorization-Answer (UAA), in response to the UAR, to the SIP/IP Core A 175a. In step 304, the SIP/IP Core A 175a transmits a command, Multimedia-Ruth-Request (MAR), to the HSS 160. In step 350, the HSS 160 transmits a command, Multimedia-Ruth-Answer (MAA), in response to the MAR, to the SIP/IP Core A 175a. In step 306, the SIP/IP Core A 175a transmits a 401 Unauthorized message, confirming that the current UE 111 has not been authorized, to the UE 111.

In step 307, the UE 111 transmits a registration message, REGISTER, to the SIP/IP Core A 175a. In step 308, the SIP/IP Core A 175a transmits a command, User-Authorization-Request (UAR), to the HSS 160. In step 309, the HSS 160 transmits a command, User-Authorization-Answer (UAA), in response to the UAR, to the SIP/IP Core A 175a. In step 310, the SIP/IP Core A 175a transmits a command, Server-Assignment-Request (SAR), to the HSS 160. In step 311, the HSS 160 transmits a command, Server-Assignment-Answer (SAA), in response to the SAR, to the SIP/IP Core A 175a. In step 312, the SIP/IP Core A 175a transmits a 200 OK message, confirming that the current UE 111 has been registered in the HSS 160, to the UE 111.

For example, the REGISTER messages transmitted from the UE 111 to the SIP/IP Core A 175 in steps 301 and 307 include information regarding a cell that the UE 111 belonged to or information regarding a location where the UE 111 is located. For example, the location information regarding UE 111 may include at least one of the following.

P-Access-Network-Info: IEEE-802.16: wimax-location=0000400121f6: if the UE 111 to the SIP/IP Core A 175 communicate according to M-WiMAX.

P-Access-Network-Info: 3GPP-E-UTRAN-FDD: e-utran-cell-id-3gpp=0000400121f6: if the UE 111 to the SIP/IP Core A 175 communicate according to LTE-FDD.

P-Access-Network-Info: 3GPP-E-UTRAN-TDD: e-utran-cell-id-3gpp=0000400121f6: if the UE 111 to the SIP/IP Core A 175 communicate according to LTE-TDD.

The REGISTER messages, transmitted from the UE 111 to the SIP/IP Core A 175 in steps 301 and 307, optionally include information regarding a cell that the UE 111 belonged to or information regarding a location where the UE 111 is located.

Alternatively, the information regarding a cell that the UE 111 belonged to or information regarding a location where the UE 111 is located may be transmitted from the UE 111 to the SIP/IP Core A 175a at different steps.

Referring again FIG. 3, the SIP/IP Core A 175a transmits a registration message, REGISTER, to the PoC server 150 in step 313. The REGISTER message in step 313 may include information regarding a cell that the UE 111 belonged to or information regarding a location where the UE 111 is located, which is included in the REGISTER messages at steps 301 and 307.

After receiving the REGISTER message, the PoC server 150 increases Total_Attached_UE (the total number of registered UEs) by one. The PoC server 150 identifies a cell that the UE 111 belonged to, based on the information regarding a cell that the UE 111 belonged to or information regarding a location where the UE 111 is located, included in the REGISTER message. The PoC server 150 increases Total_Attached_UEs_Per_[ ]Cellid for a cell that the UE 111 belonged to (i.e., the number of UEs registered in a corresponding cell) by one.

In step 314, the PoC server 150 transmits a 200 OK message to the SIP/IP Core A 175a. In step 315, the PoC server 150 transmits a SUBSCRIBE message to the SIP/IP Core A 175a. In step 316, the SIP/IP Core A 175a transmits a 200 OK message to the PoC server 150. In step 317, the SIP/IP Core A 175a transmits a NOTIFY message to the PoC server 150. In step 318, the PoC server 150 transmits a 200 OK message to the SIP/IP Core A 175a.

Alternatively, the information regarding a cell that the UE 111 belonged to or information regarding a location where the UE 111 is located may be transmitted from the SIP/IP Core A 175a to PoC server 150 at any other steps other than step 313. In such a case, the PoC server 150 receives the information and then increases Total_Attached_UE (the total number of registered UEs) and Total_Attached_UEs_Per_[ ]Cellid (the number of UEs registered in a corresponding cell), by one, respectively.

As described above referring to FIG. 3, the registration message, REGISTER, according to an embodiment of the invention includes information regarding a cell that the UE belonged to (or information regarding a location where the UE is located), and the PoC server 150 records the number of UEs registered in a corresponding cell based on the information in the message.

Figure 4:
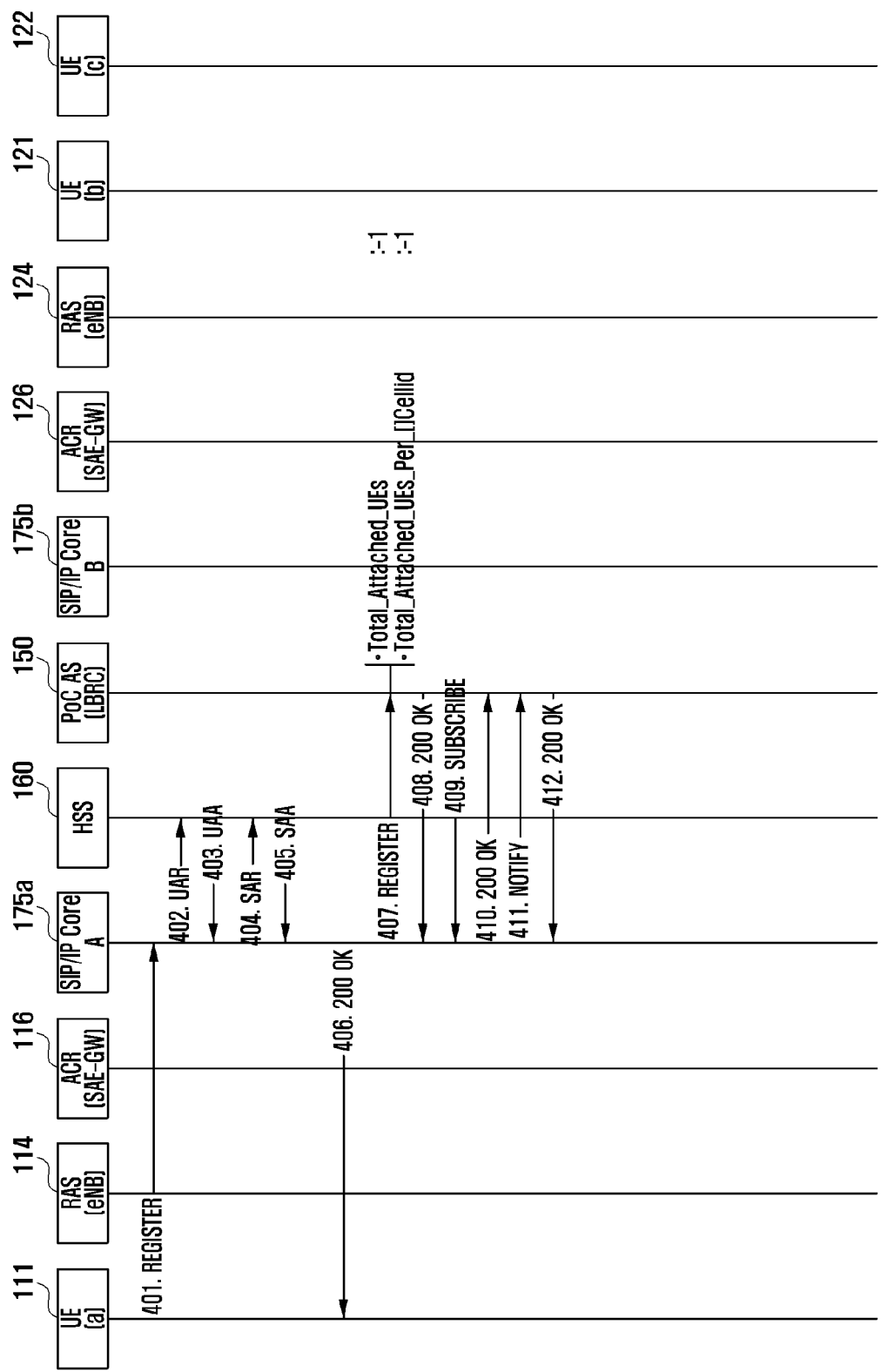
FIG. 4 is a signal flow diagram illustrating a method for releasing a PoC service according to an embodiment of the invention.

FIG. 4 is a signal flow diagram illustrating a method for releasing a PoC service according to an embodiment of the invention.

When a UE is turned off or the user operates the UE and selects a service release option, the UE performs the service release procedure.

Referring to FIG. 4, the UE 111 transmits a registration message, REGISTER, to the SIP/IP Core A 175a in step 401. The REGISTER message may include information regarding a cell that the UE 111 belonged to or information regarding a location where the UE 111 is located. For example, location information regarding the UE 111 may be expressed as shown below, i.e., the same as the service registration procedure illustrated in FIG. 3.

P-Access-Network-Info: IEEE-802.16: wimax-location=0000400121f6: if the UE 111 to the SIP/IP Core A 175 communicate according to M-WiMAX.

P-Access-Network-Info: 3GPP-E-UTRAN-FDD: e-utran-cell-id-3gpp=0000400121f6: if the UE 111 to the SIP/IP Core A 175 communicate according to LTE-FDD.

P-Access-Network-Info: 3GPP-E-UTRAN-TDD: e-utran-cell-id-3gpp=0000400121f6: if the UE 111 to the SIP/IP Core A 175 communicate according to LTE-TDD.

In step 402, the SIP/IP Core A 175a transmits a command, UAR, to the HSS 160. In step 403, the HSS 160 transmits a command, UAA, in response to the UAR, to the SIP/IP Core A 175a. In step 404, the SIP/IP Core A 175a transmits a command, Server-Assignment-Request (SAR), to the HSS 160. In step 405, the HSS 160 transmits a command, Server-Assignment-Answer (SAA), in response to the SAR, to the SIP/IP Core A 175a. In step 406, the SIP/IP Core A 175a transmits a 200 OK message, confirming that the service has been released, to the UE 111.

In step 407, the SIP/IP Core A 175a transmits a registration message, REGISTER, to the PoC server 150. The REGISTER message in step 407 may include information regarding a cell that the UE 111 belonged to or information regarding a location where the UE 111 is located, which is included in the REGISTER messages in step 401.

After receiving the REGISTER message, the PoC server 150 decreases Total_Attached_UE (the total number of registered UEs) by one. The PoC server 150 identifies a cell that the UE 111 belonged to, based on the information regarding a cell that the UE 111 belonged to or information regarding a location where the UE 111 is located, included in the REGISTER message. The PoC server 150 decreases Total_Attached_UEs_Per_[ ]Cellid for a cell that the UE 111 belonged to (i.e., the number of UEs registered in a corresponding cell) by one.

In step 408, the PoC server 150 transmits a 200 OK message to the SIP/IP Core A 175a. In step 409, the PoC server 150 transmits a SUBSCRIBE message to the SIP/IP Core A 175a. In step 410, the SIP/IP Core A 175a transmits q 200 OK message to the PoC server 150. In step 411, the SIP/IP Core A 175a transmits a NOTIFY message to the PoC server 150. In step 412, the PoC server 150 transmits a 200 OK message to the SIP/IP Core A 175a.

Figure 5:
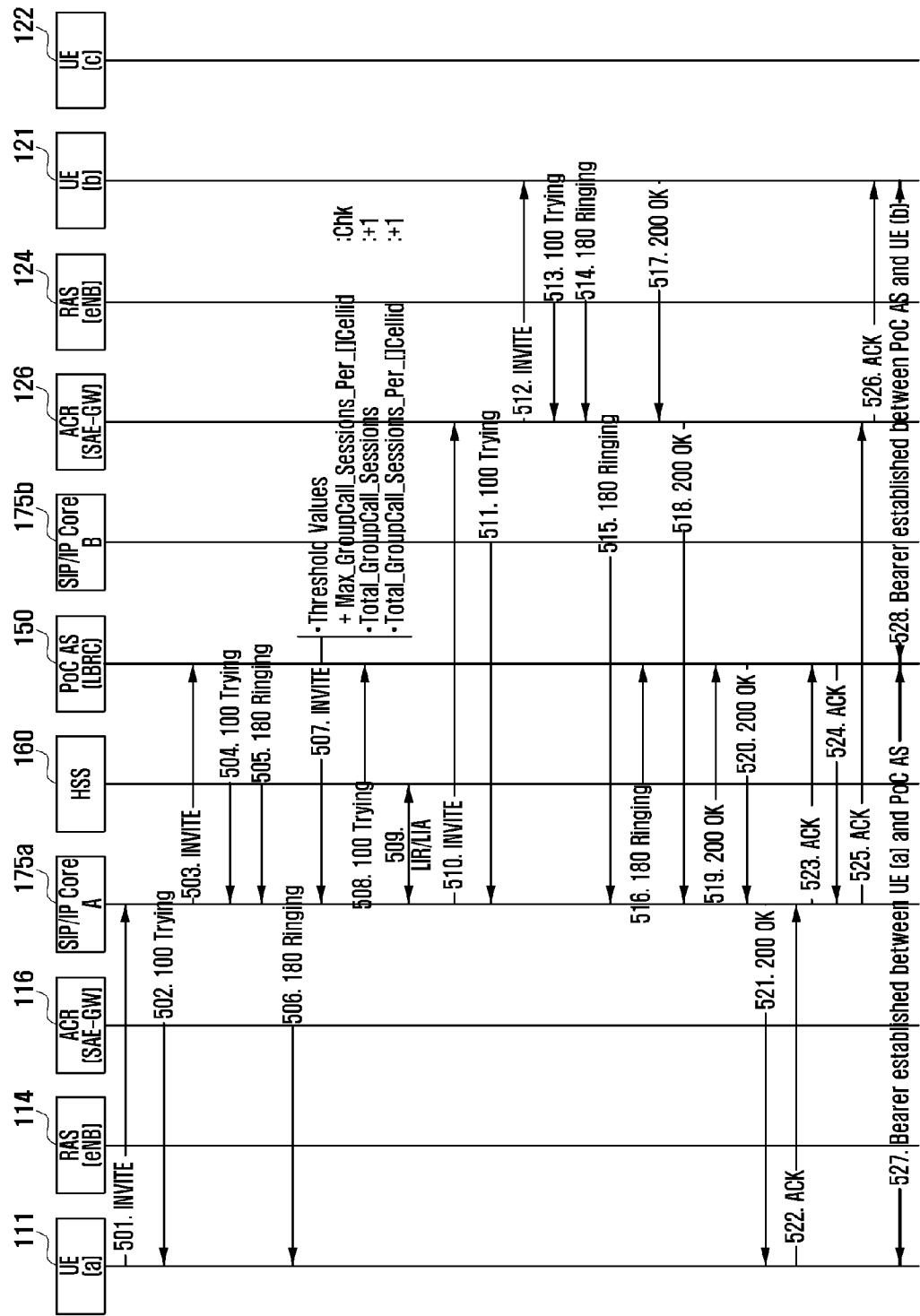
FIG. 5 is a signal flow diagram illustrating a method for processing a PoC group call request, according to an embodiment of the invention.

FIG. 5 is a signal flow diagram illustrating a method for processing a PoC group call request, according to an embodiment of the invention.

Referring to FIG. 5, in step 501, the UE 111 transmits an invitation message, INVITE, to SIP/IP Core A 175a. The INVITE message requests a PoC group call setting, and may also be referred to as a PoC group call request. The PoC group call request may include an identifier of a PoC group that needs to perform PoC communication.

For example, a user can operate the UE 111 and select a first PoC group and the PoC group call, thereby executing PoC communication. The UE 111 performs the transmission of an invitation message according to the user operation. The invitation message includes an identifier of the first PoC group.

Herein, it is assumed that the UE 111 and the UE 121 have belonged to the selected first PoC group.

In step 502, the SIP/IP Core A 175a transmits a 100 Trying message to the UE 111.

In step 503, the SIP/IP Core A 175a transmits an INVITE message to the PoC server 150. The INVITE message in step 503 includes the identifier of the first PoC group included in the INVITE message in step 501. The INVITE message in step 503 may also include information included in the INVITE message in step 501. In steps 504 and 505, the, a 100 Trying message and a 180 Ringing message are transmitted from the PoC server 150 to the SIP/IP Core A 175a. In step 506, a 180 Ringing message is transmitted from the SIP/IP Core A 175a to the UE 111.

PoC server 150 extracts information regarding the UE 111 and the UE 121 that belonged to a corresponding group, according to the identifier of a group included in the INVITE message transmitted in step 503. The PoC server 150 identifies a cell that UE 111 and UE 121 belonged to. For example, the PoC server 150 identifies information regarding a cell that the UE 111 and the UE 121 belonged to, referring to external other entities.

Alternatively, the PoC server 150 stores information regarding cells that UEs belonged to in the storage unit, and manages/uses it if necessary.

PoC server 150 identifies the number of current PoC connections to a cell that the UE 121 belonged to (Total_GroupCall_Sessions_Per_[ ]Cellid). If the number of current PoC connections to a corresponding cell is less than the number of PoC connections that can perform a simultaneous process in the cell (Max_GroupCall_Sessions_Per_[ ]Cellid), i.e., the maximum number of PoC connections to a corresponding cell, the PoC server 150 increases the total number of PoC connections Total_GroupCall_Sessions and the number of PoC connections to a corresponding cell (Total_GroupCall_Sessions_Per_[ ]Cellid), by one, respectively. Likewise, the PoC server 150 applies this procedure to the UE 111.

The method illustrated in FIG. 5 is implemented when a number of current PoC connections to a corresponding cell is less than the maximum number of PoC connections to the cell. The other cases will be explained referring to FIGS. 6, 7A, and 7B.

In step 507, if the number of current PoC connections is less than the maximum number of PoC connections to the cell, the PoC server 150 transmits an INVITE message to the SIP/IP Core A 175. Thereafter, the INVITE message is transmitted through a second ACR 126 to the UE 121 at steps 508 to 528, thereby establishing a PoC connection between the UEs 111 and 121 via the PoC server 150.

Figure 6:
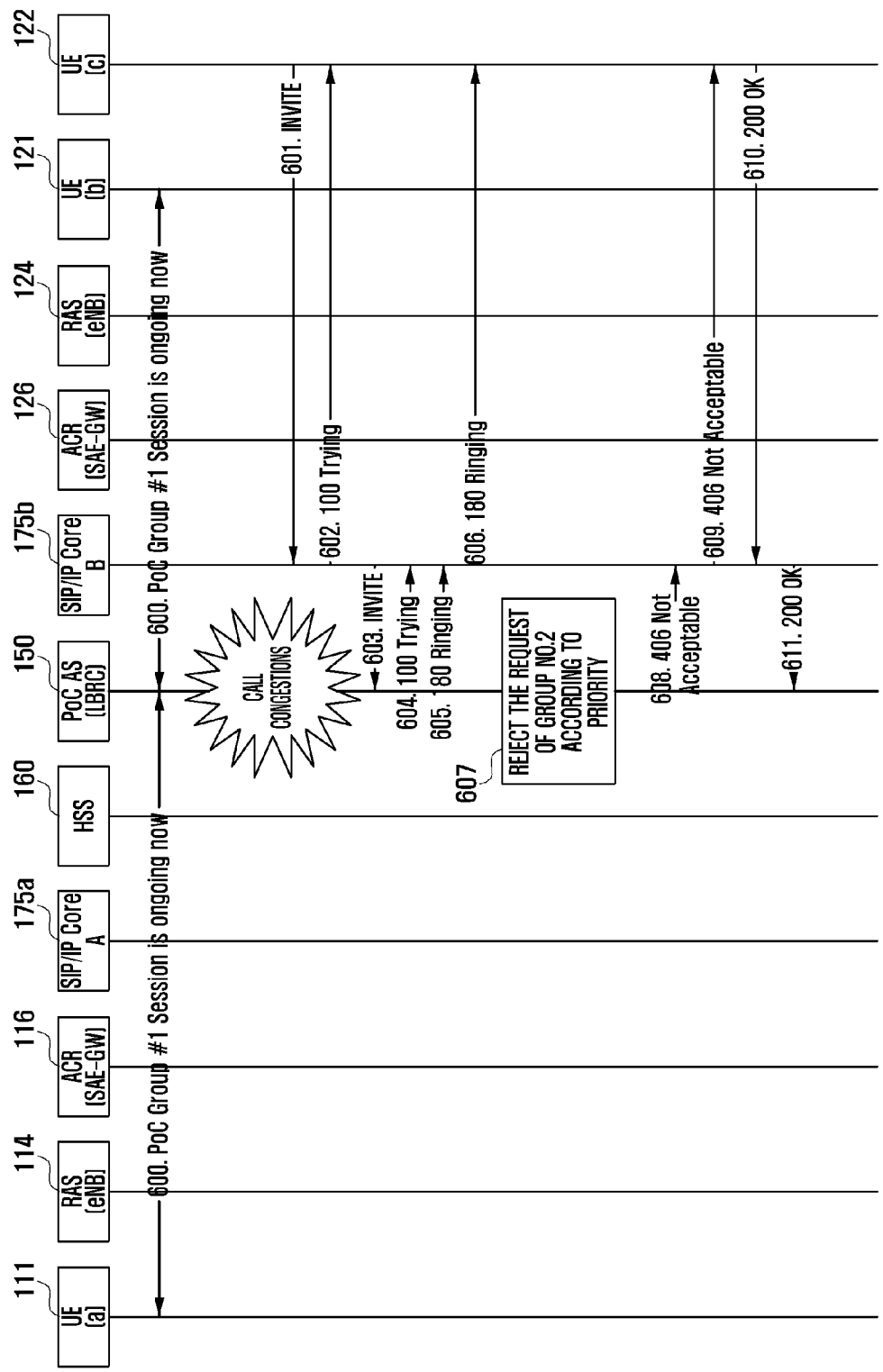
FIG. 6 is a signal flow diagram illustrating a method for processing a PoC group call request, according to an embodiment of the invention.

FIG. 6 is a signal flow diagram illustrating a method for processing a PoC group call request, according to an embodiment of the invention.

Referring to FIG. 6, in step 600, the PoC connection is ongoing in the first PoC group including the UE 111 and the UE 121. Herein, it is assumed that the UE 121 and the UE 122 belong to the same cell, and the cell that the UE 121 and the UE 122 belonged to is in a state where the number of current PoC connections is equal to or greater than the maximum number of PoC connections, i.e., a PoC call congestion state. The second PoC group includes the UE 111 and the UE 122.

In step 601, the UE 122 transmits an invitation message, INVITE, to an SIP/IP Core B 175b while the PoC connection of the first PoC group is ongoing. The INVITE message refers to a PoC group call request message for the second PoC group.

In step 602, the SIP/IP Core B 175b transmits a 100 Trying message to the UE 122, and in step 603, the SIP/IP Core B 175b transmits an INVITE message for the second PoC group to the PoC server 150.

In steps 604 and 605, the PoC server 150 transmits a 100 Trying message and a 180 Ringing message to the SIP/IP Core B 175b.

In step 606, the SIP/IP Core B 175b transmits a 180 Ringing message to the UE 122.

In step 607, the PoC server 150 analyzes and identifies the received INVITE message as a message for the second PoC group. PoC server 150 identifies whether the UE 111 and the UE 122 belong to the second PoC group. PoC server 150 may also identify a cell that the UE 111 and the UE 122 belonged to, and determine whether an additional PoC connection can be established in the cell. Because the number of current PoC connections to a cell that the UE 122 belonged to is equal to or greater than the maximum number of PoC connections, the PoC server 150 cannot process the PoC group call request via the procedure illustrated in FIG. 5. Accordingly, the PoC server 150 detects a PoC connection of a PoC group with the lowest priority, from among the PoC connections for the current cell. As described above referring to FIG. 2, PoC groups have priority values.

In FIG. 6, it is assumed that: a PoC connection of a PoC group with the lowest priority, from among PoC connections to a current, corresponding cell, is defined as a first PoC group; the priority of the first PoC group is 8; the priority of the second PoC group is 5; and the higher the priority the faster the process of the connection.

The priority of the first PoC group is greater than that of the second PoC group. The PoC server 150 compares a priority of a PoC group that attempts a new connection with that of a PoC group with the lowest priority, from among the PoC connections to the cell. If the PoC server 150 ascertains that a priority of a PoC group that attempts a new connection is less than that of a PoC group that is currently connected to the cell, it rejects the new connection request. However, if PoC server 150 ascertains that a priority of a PoC group that attempts a new connection is equal to or greater than that of a PoC group that is currently connected to the cell, it disconnects the current connection and processes the new connection request. Because the priority of the first PoC group that is currently connected to the cell is greater than that of the second PoC group that attempts a new connection in FIG. 6, the PoC server 150 rejects the connection request of the second PoC group in step 607.

In steps 608 and 609, the PoC server 150 transmits a 406 Not Acceptable message, rejecting the connection, through the SIP/IP Core B 175b, to the UE 122. In steps 610 and 611, a 200 Ok message is transmitted from the UE 122 to the SIP/IP Core B 175b, and then to the PoC server 150.

Because the connection request of the UE 122 is rejected, a connection is no longer executed with respect to the other UEs in the second PoC group. However, it should be understood that the method illustrated in FIG. 6 may be modified in such a way that, although the connection request of the UE 122 is rejected, a PoC connection may be performed in the other UEs in the second PoC group, so that they can establish a PoC connection with each other.

Figure 7A:
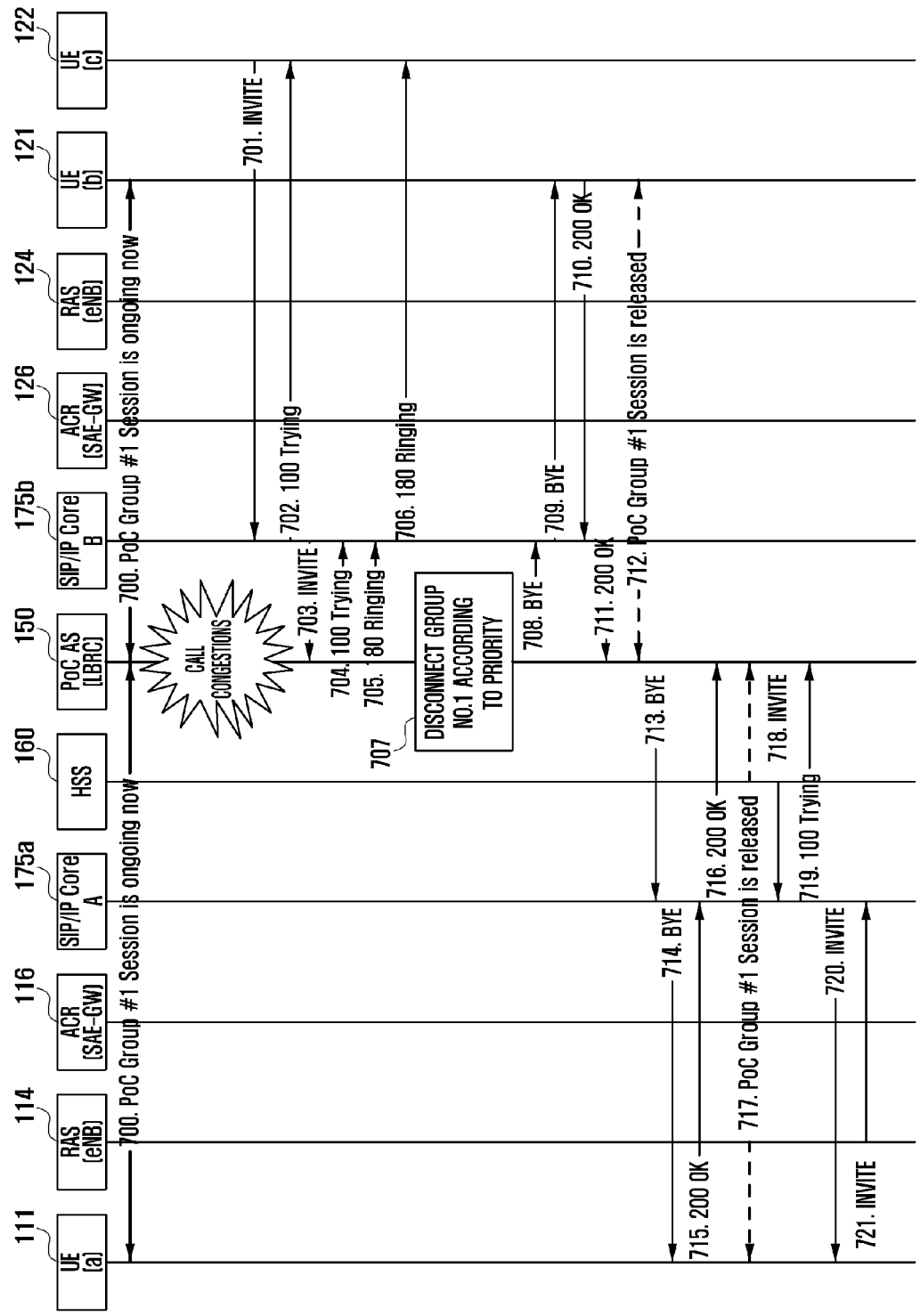
FIGS. 7A and 7B are signal flow diagrams illustrating a method for processing a PoC group call request, according to an embodiment of the invention.
Figure 7B:
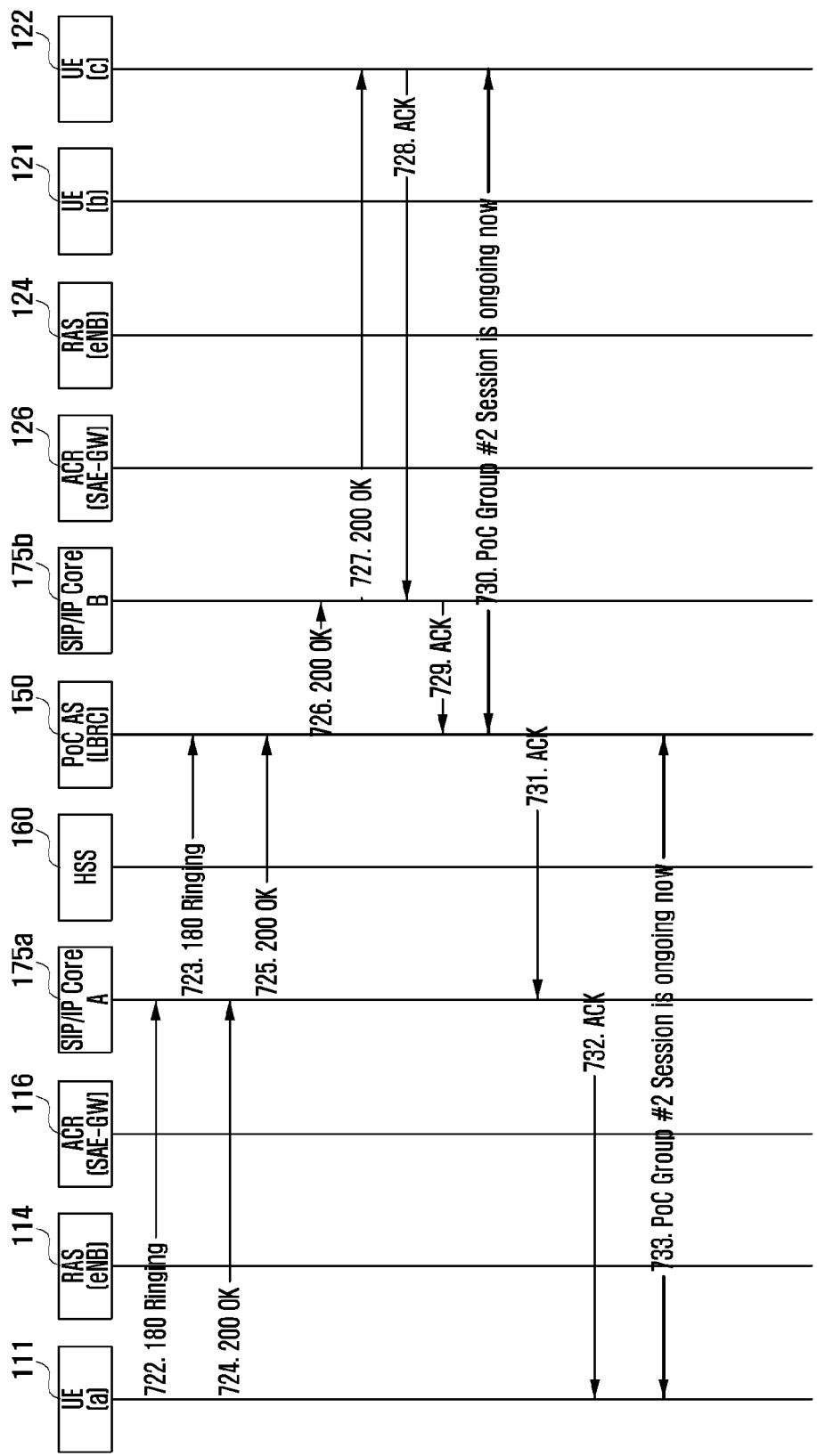

FIGS. 7A and 7B are signal flow diagrams illustrating a method for processing a PoC group call request, according to an embodiment of the invention. Specifically, in FIGS. 7 A and 7B, it is assumed that the UE 121 and the UE 122 belong to the same cell; the cell that UE 121 and UE 122 belonged to is in a state where the number of current PoC connections is equal to or greater than the maximum number of PoC connections, i.e., a PoC call congestion state; and the cell that the UE 111 belonged to is in a PoC call congestion state. The second PoC group includes the UE 111 and the UE 122. Basically, the method illustrated in FIGS. 7A and 7B is implemented in the same environment as the method illustrated in FIG. 6, except that the PoC groups have different priorities.

Referring to FIG. 7A, the PoC connection is ongoing in the first PoC group including the UE 111 and the UE 121 in step 700.

Because steps 701 to 706 are identical to steps 601 to 606 in FIG. 6, which were already described above, the detailed description will be omitted in the following description.

In step 707, the PoC server 150 analyzes and identifies the received INVITE message as a message for the second PoC group. The PoC server 150 identifies whether the UE 111 and the UE 122 belong to the second PoC group. The PoC server 150 may also identify a cell that the UE 111 and the UE 122 belonged to, and determine whether an additional PoC connection can be established in the cell. Because the number of current PoC connections to a cell that the UE 122 belonged to is equal to or greater than the maximum number of PoC connections, the PoC server 150 cannot process the PoC group call request in step 707. Accordingly, the PoC server 150 detects a PoC connection of a PoC group with the lowest priority, from among the PoC connections for the current cell.

As described above referring to FIG. 2, PoC groups have respective priority values.

In FIGS. 7A and 7B, it is assumed that a PoC connection of a PoC group with the lowest priority, from among PoC connections to a current, correspond cell, is defined as a first PoC group; the priority of the first PoC group is 3; the priority of the second PoC group is 5; and the higher the priority the faster the process of the connection. The priority of the second PoC group is greater than that of the first PoC group.

The PoC server 150 compares a priority of a PoC group that attempts a new connection with that of a PoC group with the lowest priority, from among the PoC connections to the cell. If the PoC server 150 ascertains that a priority of a PoC group that attempts a new connection is less than that of a PoC group that is currently connected to the cell, it rejects the new connection request. However, if the PoC server 150 ascertains that a priority of a PoC group that attempts a new connection is equal to or greater than that of a PoC group that is currently connected to the cell, it disconnects the current connection and processes the new connection request. Because the method illustrated in FIGS. 7A and 7B is implemented in such a way that the priority of the first PoC group that is currently connected to the cell is less than that of the second PoC group that attempts a new connection, the PoC server 150 releases the connection of the first PoC group with respect to the cell that the UE 121 and the UE 122 belonged to and processes the connection of the second PoC group. In addition, the PoC server 150 releases the connection of the first PoC group with respect to the cell that the UE 111 belonged to and processes the connection of the second PoC group.

In steps 708 to 712, the PoC connection of Group 1 is released between the PoC server 150 and the UE 121. Likewise, the PoC connection of Group 1 is released between PoC server 150 and UE 111 via steps 713 to 717.

In steps 718 to 733, the PoC connection of Group 2 is established between the UE 111 and the UE 122, via PoC server 150.

In FIGS. 7A and 7B, because the number of actual PoC connections does not vary, this was not described. However, if there is a change in the number of actual PoC connections, the PoC server 150 reflects the change in the data and stores the result.

Figure 8:
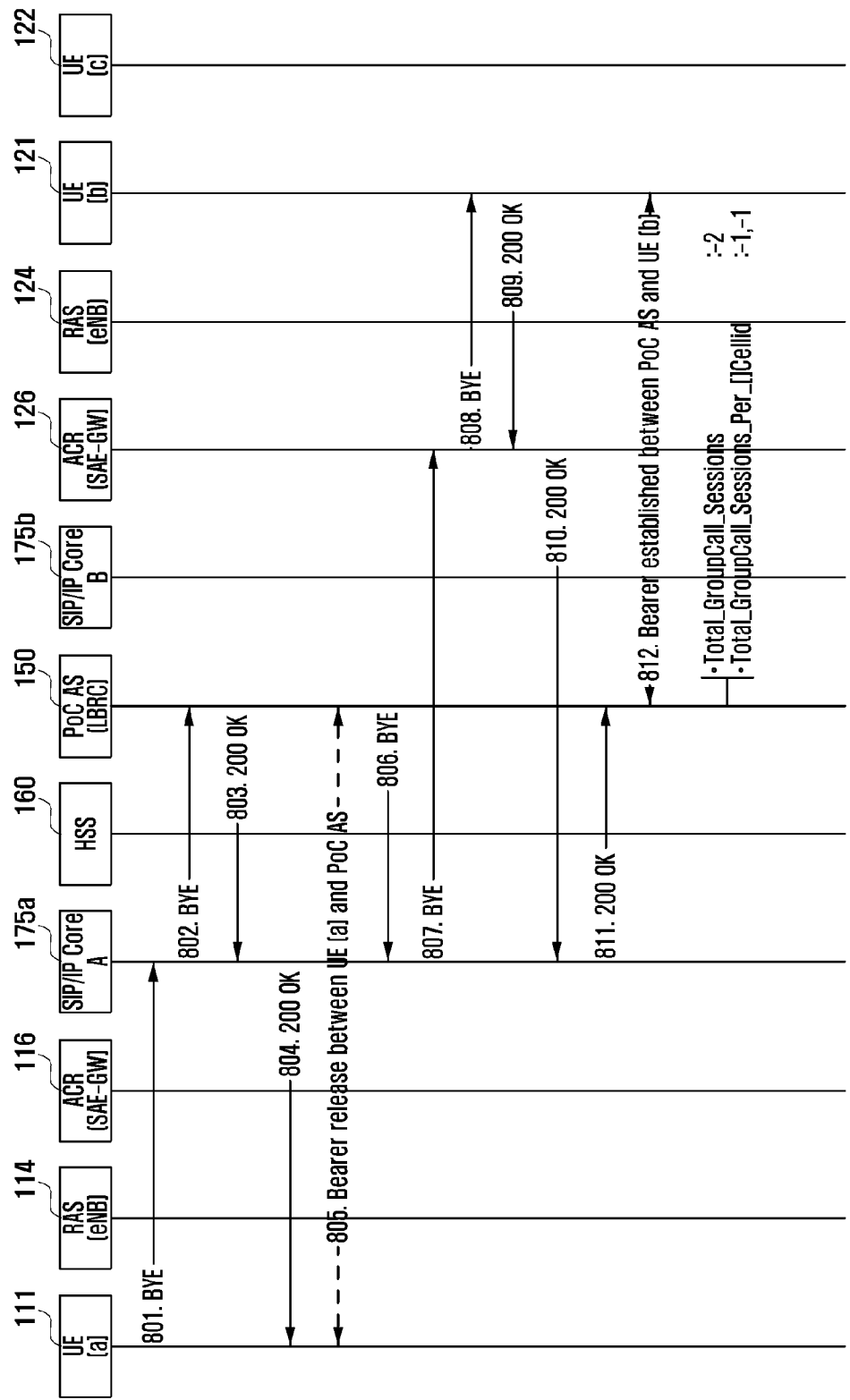
FIG. 8 is a signal flow diagram illustrating a method for terminating a PoC group call according to an embodiment of the invention.

FIG. 8 is a signal flow diagram illustrating a method for terminating a PoC group call according to an embodiment of the invention. In FIG. 8, it is assumed that a PoC group connection has already been established between the UE 111 and the UE 121.

Referring to FIG. 8, the UE 111 transmits a PoC group disconnection request message, BYE, to the SIP/IP Core A 175a in step 801. For example, a user operates the UE 111 and requests to terminate the PoC connection to PoC group 1. In step 802, the SIP/IP Core A 175a transmits the received disconnection request, BYE, to the PoC server 150. The 200 OK message is transmitted from the PoC server 150 to the SIP/IP Core A 175a, and then to the UE 111 in step 803 and 804. In step 805, the PoC connection is released between the PoC server 150 and the UE 111. The disconnection request is transmitted from the PoC server 150, via the SIP/IP Core A 175a and the ACR 126, to the UE 121 in steps 806 to 808. The 200 OK message is transmitted from the UE 121, via the ACR 126 and the SIP/IP Core A 175a, to the PoC server 150 in steps 809 to 811. Therefore, the PoC connection is released between the PoC server 150 and the UE 121 in step 812.

During the processes, the total number of PoC connections (Total_GroupCall_Sessions) is reduced by two. In addition, the numbers of PoC connections (Total_Attached_UEs_Per_[ ]Cellid) for a cell that the UE 111 belonged to and a cell that the UE 121 belonged to are reduced, by one, respectively. The PoC server 150 reflects information regarding the change to data stored therein.

Figure 9:
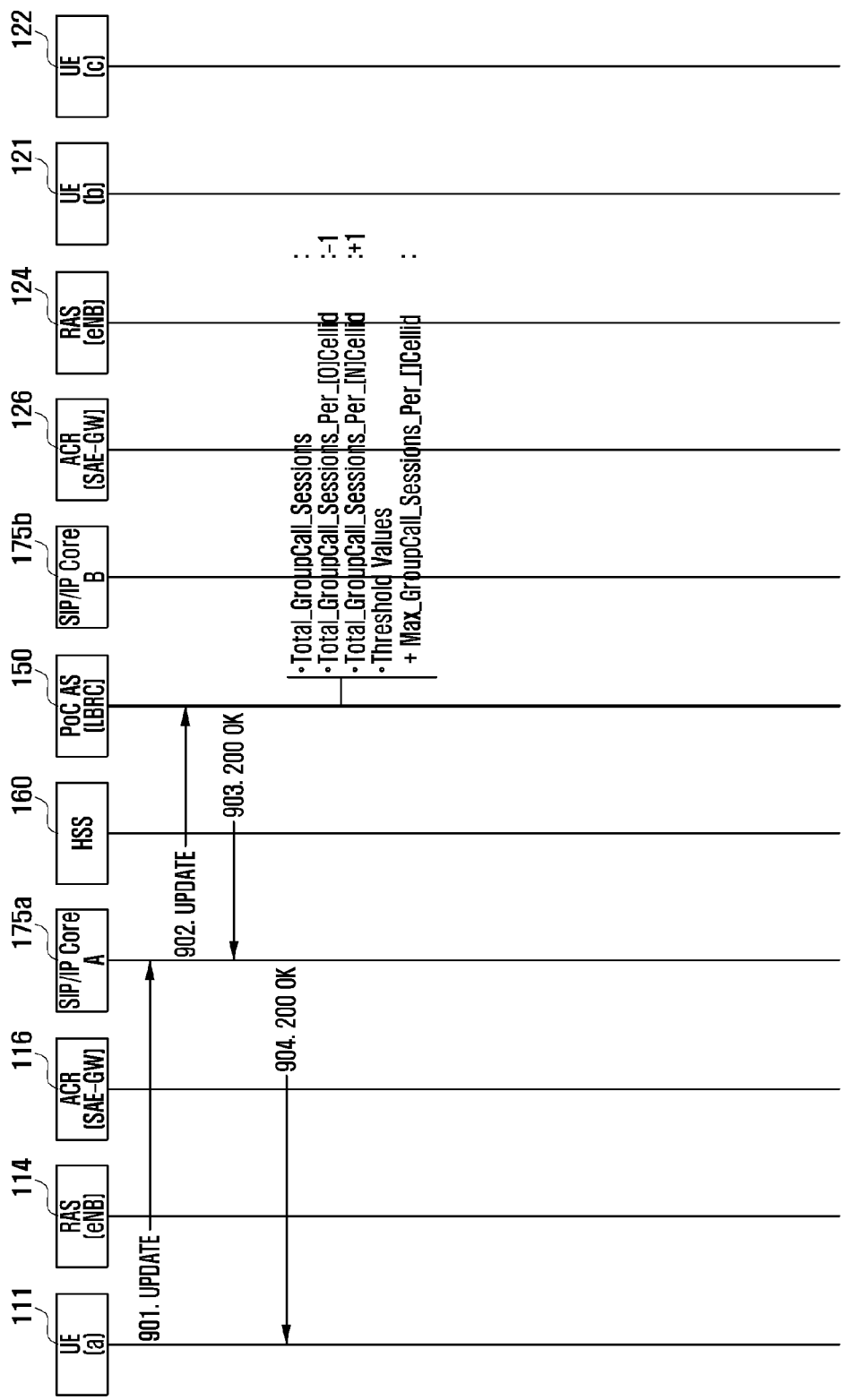
FIG. 9 is a signal flow diagram illustrating a method for processing movement operations of UE according to an embodiment of the invention.

FIG. 9 is a signal flow diagram illustrating a method for processing movement operations of UE, according to an embodiment of the invention. In FIG. 9, it is assumed that a PoC connection has been established between the UE 111 and the PoC server 150; and the UE 111 moves from a first cell to a second cell.

Referring to FIG. 9, in step 901, the UE 111 transmits a PoC update message, UPDATE, to the SIP/IP Core A 175a. In step 902, the SIP/IP Core A 175a transmits the received PoC update message to the PoC server 150. The PoC update message includes identification information regarding a cell where the UE 111 is newly located after it moves or information regarding a location where the UE is located. The format of the cell identification information or the location information may be identical to or similar to that of the embodiment illustrated in FIG. 3.

For example, the location information regarding UE 111 may include at least one of the following.
- P-Access-Network-Info: IEEE-802.16: wimax-location=0000400121f6: if the SIP/IP Core A 175a and the UE 111 communicate according to M-WiMAX.
- P-Access-Network-Info: 3GPP-E-UTRAN-FDD: e-utran-cell-id-3gpp=0000400121f6: if the SIP/IP Core A 175a and the UE 111 communicate according to LTE-FDD.
- P-Access-Network-Info: 3GPP-E-UTRAN-TDD: e-utran-cell-id-3gpp=0000400121f6: if the SIP/IP Core A 175a and the UE 111 communicate according to LTE-TDD.

The PoC server 150 analyzes the received PoC update message and detects the identification information regarding a cell to which the UE 111 newly moves. The PoC server 150 extracts information regarding the old location where the UE 111 was located before it moved to the new location, according to information that the PoC server 150 has stored or via another method. The PoC server 150 may store information regarding cells that UEs have been connected to.

In the modification, the PoC update message may include identification information regarding a cell where the UE 111 was located before it moved or information regarding a location where the UE is currently located. In that case, the PoC server 150 analyzes the PoC update message and detects location information before and after the UE 111 moves.

The PoC server 150 decreases the total number of PoC connections for cells where the UE 111 was originally located, by one, and increases the total number of PoC connections for cells where the UE 111 is newly located, by one, according to the detected information. In FIG. 9, it is assumed that a cell where the UE is newly located is not in a PoC connection congestion state. If a cell where the UE is newly located is in a PoC connection congestion state, the priorities of PoC groups are compared with each other and the PoC connection of a PoC group with the lowest priority is released, as described in the embodiments referring to FIGS. 6, 7A, and 7B. In the modification, if UE moves, PoC connections may all be maintained irrespective of congestion states.

In steps 903 and 904, the 200 OK message is transmitted from the PoC server 150, via the SIP/IP Core A 175a, to the UE 111.

Figure 10:
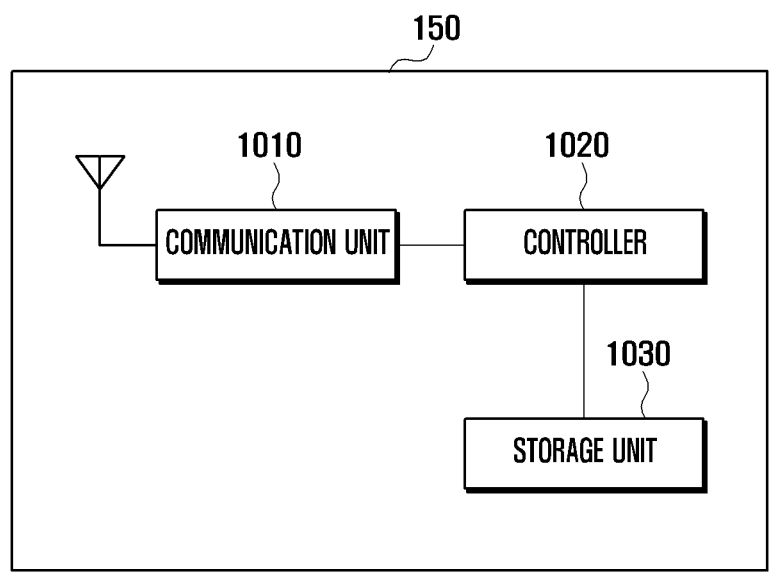
FIG. 10 is a block diagram illustrating a PoC server according to an embodiment of the invention.

FIG. 10 is a schematic block diagram illustrating a PoC server according to an embodiment of the invention.

Referring to FIG. 10, the PoC server 150 includes a communication unit 1010, a controller 1020, and a storage unit 1030. The communication unit 1010 receives a PoC group call request for requesting a PoC connection to a specific PoC group from UE 111.

After receiving the PoC group call request, the controller 1020 extracts information regarding cells where the other UEs that belonged to the PoC group are located and compares the number of current PoC connections corresponding to the cell with the maximum number of PoC connections corresponding to the cell. If the controller 1020 ascertains that the number of current PoC connections is less than the maximum number of PoC connections, the controller 1020 controls the communication unit 1010 to establish PoC connections with the other UEs. However, if the number of current PoC connections is equal to or greater than the maximum number of PoC connections, the controller 1020 releases old connections according to the priorities and processes or rejects new connections, as was described above referring to FIGS. 2 to 9.

The storage unit 1030 stores PoC group information and cell based management information, as described above referring to FIG. 2.

Again, the PoC group information refers to information regarding PoC groups managed by a PoC server and may include at least four fields, e.g., ID, Name, Members, and Priority, as described above.

When the PoC connection is released or established, or the UE moves, the controller 1020 updates Total_GroupCall_Sessions and Total_VoipCall_Sessions_Per_[ ]Cellid, stored in the storage unit 1030. In addition, when information regarding the UE is registered/removed in/from PoC server 150, the controller 1020 updates Total_Attached_UEs and Total_Attached_UEs_Per_[ ]Cellid, stored in the storage unit 1030. The updating processes are performed in the same way as described above referring to FIGS. 2 to 9.

As described above, the system and method for providing PoC services according to the above-described embodiments of the invention can properly control communication congestion in PoC groups based on cells.

In addition, it should be understood that the process and the operations of the mobile device, described above, can be performed via computer programming instructions. These computer programming instructions can be installed to processors of data processing equipment that can be programmed, special computers, or universal computers.

In order to implement a particular mode, the computer programming instructions can also be stored in a computer available memory or computer readable memory that support computers or data processing equipment that can be programmed. Therefore, the instructions, stored in the computer available memory or computer readable memory, can be installed to the products, and perform the functions therein. In addition, because the computer programming instructions can also be installed to computers or data processing equipment that can be programmed, they can create processes that perform a series of operations therein.

In the above-described embodiments, the terminology, component '~unit,' refers to a hardware element such as a PGGA, an ASIC, etc., or combination of a software element and a hardware element, and performs a corresponding function.

The terms or words described in the description and the claims should not be limited by a general or lexical meaning, instead should be analyzed as a meaning and a concept through which the inventor defines and describes the invention at his most effort, to comply with the idea of the invention.

Although various embodiments of the present invention have been described in detail hereinabove, it should be understood that many variations and modifications of the basic inventive concept herein described, which may be apparent to those skilled in the art, will still fall within the spirit and scope of the embodiments of the invention as defined in the appended claims and their equivalents.

What is claimed is:

1. A method for providing a Push to talk over Cellular (PoC) service via a PoC server, the method comprising:
    receiving, by the PoC server, a PoC group call request for requesting a PoC connection for a PoC group from a first User Equipment (UE);
    extracting information regarding a cell where a second UE that belonged to the PoC group is located, according to the received PoC group call request;
    comparing a number of current PoC connections corresponding to a cell with a maximum number of PoC connections to the cell; and
    determining whether to establish a PoC connection with the PoC group based on a priority of PoC groups, if the number of current PoC connections is greater than or equal to the maximum number of PoC connections.

2. The method of claim 1, wherein determining whether to establish a PoC connection with the PoC group based on a priority of PoC groups comprises:
    extracting a first priority of the PoC group; and
    extracting a PoC group with a lowest priority, from among PoC groups corresponding to PoC connections of UEs located in the cell, and a second priority of a selected PoC group,
    wherein, if the second priority is greater than or equal to the first priority, the PoC server does not establish a PoC connection with the second UE.

3. The method of claim 2, wherein, if the second priority is less than the first priority, further comprising:
    releasing the PoC connection corresponding to the second priority and establishing the PoC connection with the second UE.

4. The method of claim 3, wherein, if a PoC connection for a UE located in the cell is established, further comprising:
    increasing the number of current PoC connections corresponding to the cell by one.

5. The method of claim 4, wherein, if a PoC connection for a UE located in the cell is released, further comprising:
    decreasing the number of current PoC connections corresponding to the cell by one.

6. The method of claim 5, wherein, if a UE that has established a PoC connection moves from a first cell to a second cell, further comprising:
    decreasing a number of current PoC connections corresponding to a first cell by one; and
    increasing a number of current PoC connections corresponding to a second cell by one.

7. A Push to talk over Cellular (PoC) server for providing a PoC service, the PoC server comprising:
    a communication unit for receiving a PoC group call request for requesting a PoC connection for a PoC group from a first User Equipment (UE);
    a controller for extracting information regarding a cell where a second UE that belonged to the PoC group is located, according to the received PoC group call request, and comparing a number of current PoC connections corresponding to a cell with a maximum number of PoC connections to the cell,
    wherein the controller determines whether to establish a PoC connection with the PoC group based on a priority of PoC groups, if the number of current PoC connections is greater than or equal to the maximum number of PoC connections.

8. The PoC server of claim 7, wherein the controller determines whether to establish a PoC connection with the PoC group based on a priority of PoC groups by extracting a first priority of the PoC group, a PoC group with a lowest priority, from among the PoC groups corresponding to PoC connections of UEs located in the cell, and a second priority of a selected PoC group, and
    wherein the controller does not establish the PoC connection with the second UE, if the second priority is greater than or equal to the first priority.

9. The PoC server of claim 8, wherein, if the second priority is less than the first priority, the controller releases the PoC connection corresponding to the second priority and establishes a PoC connection with the second UE.

10. The PoC server of claim 9, wherein, if a PoC connection for a UE located in the cell is established, the controller increases the number of current PoC connections corresponding to the cell by one.

11. The PoC server of claim 10, wherein, if a PoC connection for a UE located in the cell is released, the controller decreases the number of current PoC connections corresponding to the cell by one.

12. The PoC server of claim 11, wherein, if a UE that has established a PoC connection moves from a first cell to a second cell, the controller decreases a number of current PoC connections corresponding to the first cell by one, and increases the number of current PoC connections corresponding to the second cell by one.

* * * * *